United States Patent [19]

Gordon et al.

[11] 3,780,353

[45] Dec. 18, 1973

[54] PANEL METER CONSTRUCTION

[75] Inventors: Bernard M. Gordon, Magnolia; Brant W. Becker, Sudbury; Charles Prescott, Wilmington, all of Mass.

[73] Assignee: Gordon Engineering Company, Wakefield, Mass.

[22] Filed: July 5, 1972

[21] Appl. No.: 269,031

[52] U.S. Cl. ..... 317/101 DH, 174/52 R, 200/168 C, 248/27

[51] Int. Cl. ............................................ H02b 1/62

[58] Field of Search ............... 317/101 R; 174/52 R, 174/158; 151/41.75; 248/27; 200/168 C

[56] References Cited

UNITED STATES PATENTS

| | | | |
|---|---|---|---|
| 3,159,436 | 12/1964 | Davis | 174/52 R |
| 2,562,260 | 7/1951 | Caldwell | 248/27 |
| 2,974,703 | 3/1961 | Rapata | 174/158 R |

*Primary Examiner*—David Smith, Jr.
*Attorney*—Gerald Altman et al.

[57] ABSTRACT

A panel meter housing comprises an extrusion of definite length in the form of an open sided channel having integral upper, lower and rear walls. An integral rail is provided at the forward margin of the upper and lower walls. The definite length of extrusion is separated from an indefinite length of extrusion, the definite length being slightly longer than the width dimension of a panel meter component package to be mounted within the housing. The panel meter component package is inserted within the channel, the upper and lower rails operating to retain the package. Sidewalls having like profiles are mounted to the opened sides of the channel to form the panel meter housing. Each sidewall is formed with a cruciform opening which is adapted to receive a fastener for universal mounting of the panel meter housing.

8 Claims, 9 Drawing Figures

PANEL METER CONSTRUCTION

BACKGROUND OF THE INVENTION

1. Field of Invention

The present invention relates to panel meters and, more particularly, is directed towards panel meter construction.

2. Description of the Prior Art

Generally panel meters, which are employed in conjunction with electronic equipment for presenting unknown analog voltages in digital form, are mounted within rigid molded casings. Since it is desirable to make the casing as small as possible, the size of the casing being dependent upon the components housed therein, manufacturers have been required to stock fitted molded casings of various dimensions. Molding and stocking of assorted casings have resulted in increase costs to manufacturers. A need has arisen for an inexpensive panel meter casing which is readily adapted for reception of electronic component packages of various dimensions.

SUMMARY OF THE INVENTION

It is an object of the present invention to provide a universal panel meter casing which is characterized by high versalility and low cost. The panel meter casing comprising an open sided channel formed with integral upper, lower and rear walls and an integral rail about the forward margin of the upper and lower walls. The channel is an extrusion of definite length having a U-shaped profile in cross section, the upper, lower and rear walls defining an open sided storage compartment. The definite length of extrusion, as determined by the dimensions of an electronic component package to be within the storage compartment, is separated from an indefinite length of extrusion, the definite length being slightly larger than the width dimension of the electronic package. The component package is inserted through the open sidewalls into the storage compartment, the upper and lower rails operating to retain the component package within the storage compartment. Rigid sidewalls having like profiles are mounted to the housing on opposite sides thereof. Each sidewall is formed with a cruciform opening which is adapted to receive a fastener for universal mounting of the panel meter casing. Opposed grooves formed in each rail defines a guideway adapted to receive a translucent shield cover. The combination of extrusion, rigid sidewalls and translucent shield is such as to provide a panel meter casing characterized by high versalility and low cost.

Other objects and advantages of the invention will become apparent from the following detailed description of one specific embodiment of the invention.

The invention accordingly comprises the method steps and apparatus possessing the construction, combination of elements and arrangements of parts that are exemplified in the following detailed disclosure, the scope of which will be indicated in the appended claims.

BRIEF DESCRIPTION OF THE DRAWINGS

For a fuller understanding of the nature and objects of the present invention, reference should be had to the following detailed description taken in connection with the accompanying drawings wherein.

DETAILED DESCRIPTION OF INVENTION

Figure 2:
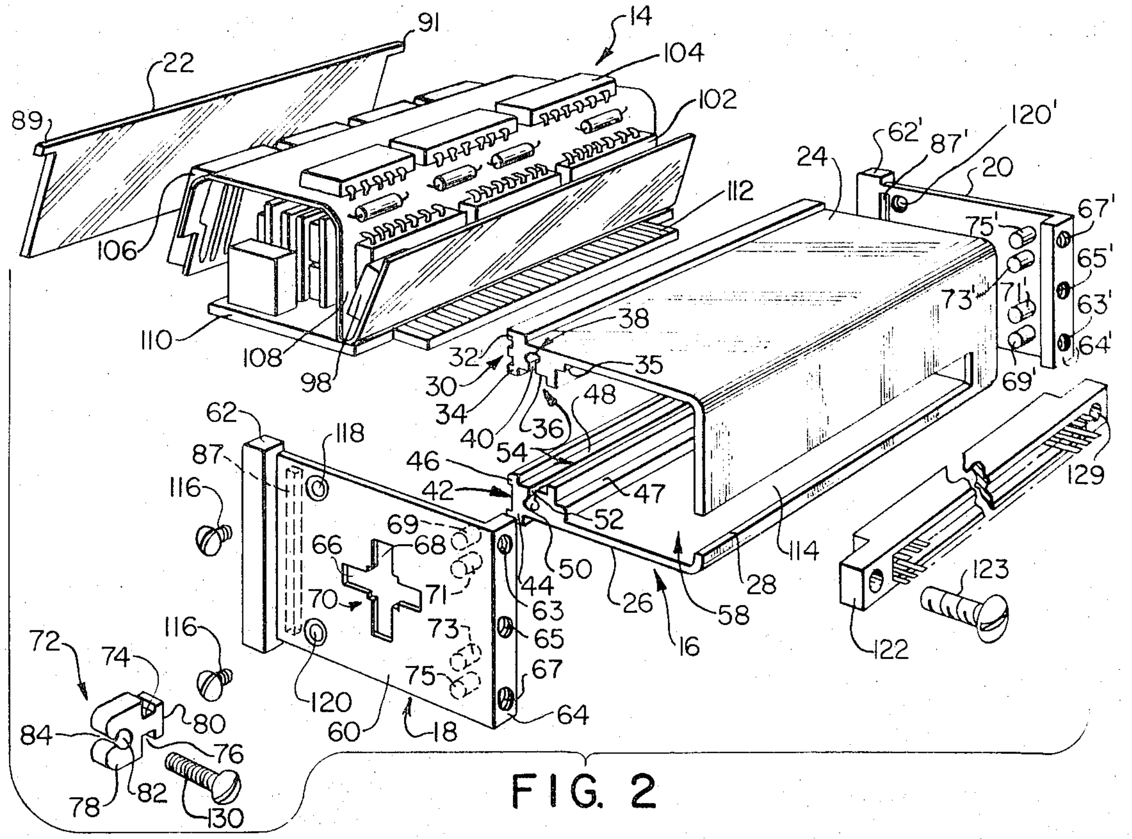
FIG. 2 is an exploded view, in perspective, illustrating the detailed structure of the panel meter of FIG. 1.
Figure 1:
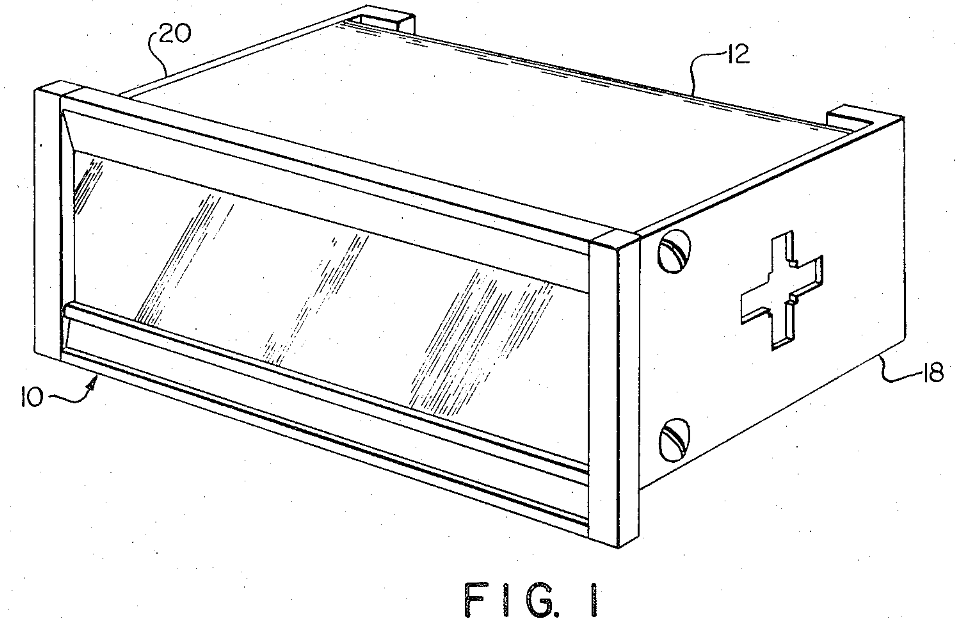
FIG. 1 is a perspective of a panel meter made according to the present invention.

Referring now to the drawings, particularly FIGS. 1 and 2, there is shown a panel meter 10 comprising a chassis 12 which includes a frame 16, like sidewalls 18, 20 and a filter 22.

Frame 16 is an extrusion having a substantially U-shaped profile in cross section and includes a top wall 24, a bottom wall 26 and a rear wall 28. In the illustrated embodiment, extrusion 16 is composed of a metal, for example aluminum. It is to be understood that, in alternative embodiments, extrusion 16 is resilient and is composed of a polymer, for example a polyvinyl resin such as acrylonitride-butadienne-styrene. Top wall 24 and bottom wall 26 are substantially in spaced parallel relationship to one another and are disposed in a plane substantially perpendicular to the plane of rear wall 28, the intersection of top wall 24, rear wall 28 and bottom wall 26 rear wall 28 defining arcuate corners.

The forward margin of top wall 24 is formed with an integral rail 30 which terminates in an upwardly extending lip 32 and a downwardly extending flange 34, the outer faces of lip 32 and flange 34 tapering inwardly toward bottom wall 26. The rearward face of flange 34 defines a step 35. At the interior face of top wall 24, flange 34 is formed with a channel 36 and a groove 38 which are disposed in spaced parallel relationship with rear wall 28 and extend across the length of top wall 24. The cross-sectional profile of groove 38 is substantially circular having a reentrant opening 40. The profile of channel 36 in cross section is substantially U-shaped with square corners.

The forward margin of bottom wall 26 is formed with an integral rail 42 which terminates in a downwardly extending lip 44 and an upwardly extending flange 46, the outer faces of lip 44 and flange 46 tapering inwardly toward top wall 24. The rearward face of rail 42 defines a step 47. At the interior face of bottom wall 26, flange 46 is formed with a channel 48 and a groove 50 which are disposed in parallel relationship with rear wall 28 and extend across the length of bottom wall 26. The profile of groove 50 in cross section is substantially circular having a reentrant opening 52. The cross-sectional profile of channel 48 is substantially U-shaped with square corners. The open sides of channels 36 and 48 are in spaced registration, channel 36 and 48 defining a guideway 54 which is adapted for reception of a portion of a component package 14 and filter 22. The interior faces of rail 30, top wall 24, rear wall 28, bottom wall 26 and rail 42 define a storage cavity 58 which is adapted to retain component package 14.

Sidewall 18 includes a substantially rectangular plate 60 having intergral flanges 62, 64 at opposite ends thereof. Flange 62 extends outwardly from the forward end of plate 60 and flange 64 extends inwardly from the rearward end of plate 60. The top and bottom margins of flange 62 project beyond the top and bottom edges, respectively, of plate 60. The top and bottom margins of flange 64 are flush with the top and bottom edges, respectively, of plate 60. As best shown in FIG. 1, the profile of sidewall 18 is such that, when mounted to frame 16 in the manner hereinafter described, the top and bottom edges of plate 60 are substantially flush with the exterior faces of top wall 24 and bottom wall 26, respectively of extrusion 16. The forward face of flange 64 is in juxtaposition with the exterior face of rear wall 28 and the inner face of flange 62 is in registration with lips 32 and 44. The rearward face of flange 64 is formed with holes 63, 65 and 67 and the interior face of plate 60 is provided with pins 69, 71, 73 and 75. The interior face of plate 60 is formed with a groove 87 which is adapted to receive a tab 89 provided on filter 22.

Sidewall 18 is formed also with intersecting rectangular apertures 66, 68 which define a cruciform opening 70. The longitudinal axis of aperture 66 is disposed in a plane which is in spaced parallel relationshp with the top and bottom edges of plate 60. The longitudinal axis of aperture 68 is disposed in a plane perpendicular to the longitudinal axis of aperture 66. In the preferred embodiment, cruciform opening 70 is adapted to receive a mounting device 72 which, in the illustrated embodiment, is an extrusion composed of a metal such as aluminum. Mounting device 72 is formed with a pair of opposed channels 74, 76 which operate to divide mounting device 72 into a head portion 78 and base portion 80. Head 78 is formed with a bore 82 having a reentrant opening 84. As hereinafter described, cruciform opening 70 is adapted to receive mounting device 72 in such a manner as to provide various mounting configurations for panel meter 10.

As hereinbefore noted, sidewalls 18 and 20 are identical structures having like parts, corresponding parts of sidewalls 18 and 20 being denoted by like reference characters and distinguished by a primed notation. It will be readily appreciated that groove 87 formed in sidewall 20 is adapted to receive a tab 91 provided in filter 22. In the preferred embodiment, each sidewall 18 and 20 is a casting composed of a metal such as aluminum. It will be readily appreciated that sidewall 20 is the mirror image of sidewall 18. In other words, sidewalls 18 and 20 are fabricated from the same mold. As hereinafter described, when sidewalls 18 and 20 are mounted to opposite sides of extrusion 16, there is provided a fitted panel meter casing for component package 14. It is to be understood that the height dimension of component package 14 is slightly smaller than the height dimension between the interior faces of top wall 24 and bottom wall 26 and is slightly larger than the distance between rails 30 and 42.

Figure 3:
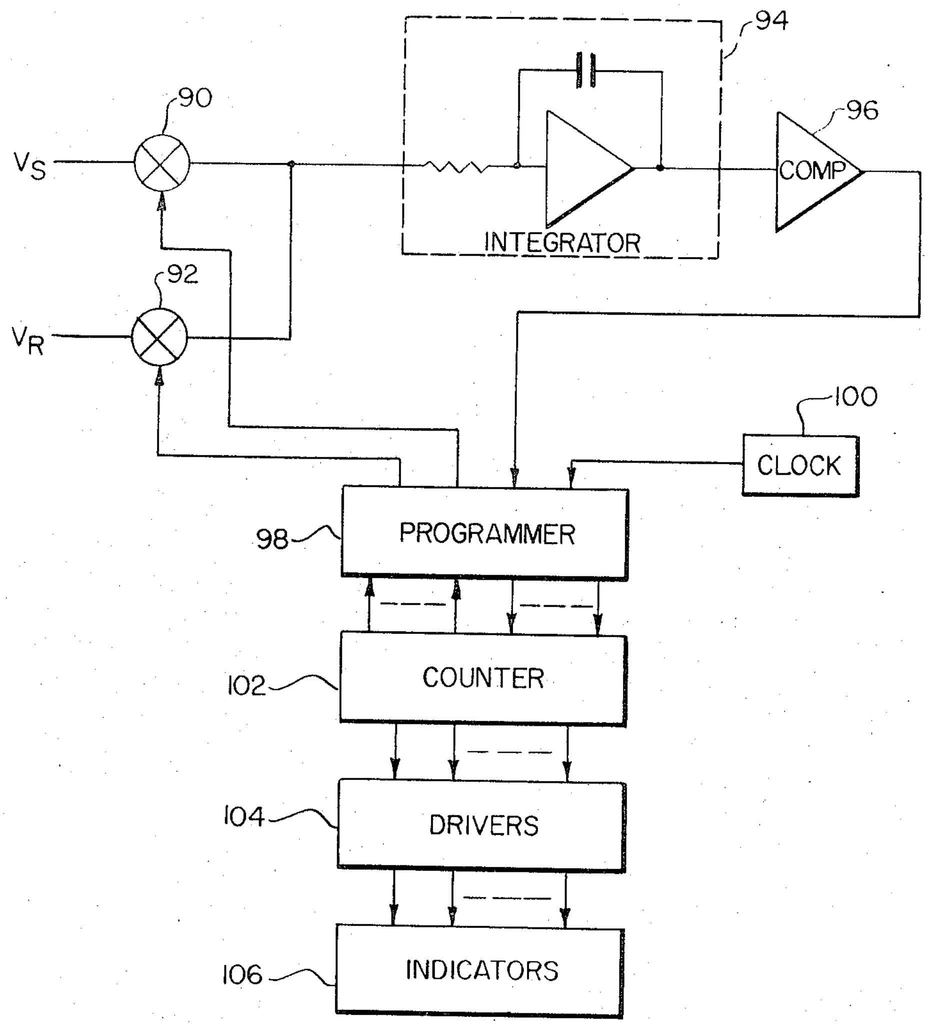
FIG. 3 is a schematic diagram of a component package mounted within the panel meter casing of FIG. 1.

Referring to FIG. 3, it will be seen that component package 14 is an analog to digital converter, for example an integrating-ramp analog to digital converter such as a dual slope integrating analog to digital converter. Analog to digital converter 14 comprises switches 90,92; an integrator 94; a comparator 96; programmers 98; a clock 100; counters 102; drivers 104 and indicators 106. In operation, a start conversion signal, which is applied to programmers 98, clears counter 102 and closes switch 90, switch 92 being opened. An input signal Vs is integrated in integrator 94 for a fixed time interval which is determined by clock pulses generated by clock 100 and applied to counter 102. During the integration time interval, the signal at the output of integrator 94 increases as a linear ramp signal from an initial voltage. At the end of the fixed integration time interval, switch 90 is opened and switch 92 is closed. A reference signal Vr is applied to integrator 94 through closed switch 92. The reference signal causes the signal at the output of integrator 94 to decrease. During the second integration interval clock pulses are counted by counter 102. When the signal at the output of integrator 94 reaches the initial voltage, comparator 96 changes state and the clock pulses are inhibited from entering counter 102. The number of clock pulses recorded in counter 102 during the second integration interval is a digital representation of the input signal Vs. The count recorded in counter 102 is applied to indicators 106 via drivers 104 for presentation. In the preferred embodiment, analog to digital converter 14 is mounted on a flexible circuit board 108 and a rigid circuit board 110. By way of example, programmers 98, counters 102, drivers 104 and indicators 106 are mounted on flexible circuit board 108 and switches 90,92 integrator 94, comparator 96 and clock 100 are mounted on rigid circuit board 110.

For a fuller understanding of the invention, reference is now made to the method of fabricating panel meter 10. An endless extrusion having a cross-sectional profile corresponding to frame 16 is extruded using known techniques. A definite length of frame 16 is separated from the endless extrusion. The length of frame 16 is determined by the dimensions of component package 14, the length of frame 16 being slightly longer than the length of component package 14. In the illustrated embodiment in which extrusion 16 is composed of a metal, analog to digital converter 14 is inserted through the open sidewall of extrusion 16, indicators 106 being received within channels 36 and 48. Rigid circuit board 110 is held between the rearward face of flange 46 and the interior face of rear wall 28.

In the alternative embodiment wherein extrusion 16 is a polymer, analog to digital converter 14 is inserted into storage cavity 58 by temporarily enlarging the orifice between flanges 34 and 46 by spreading rails 30 and 42. Analog to digital converter 14 is inserted in storage cavity 58 so that rigid circuit board 110 is engaged by the rearward face of flange 46 and the interior face of rear wall 28, indicators 106 being received in channels 36 and 48. When flanges 34 and 46 are released, extrusion 16 returns to its original configuration.

In both embodiments, described, a connector strip 112 at a rearward portion of rigid circuit board 110 is received in an aperture 114 formed in rear wall 28. Thereafter, sidewall 18 is mounted to extrusion 16 by means of fasteners 116, for example self-tapping screws, which are threaded into grooves 38 and 50. It is to be understood that screws 116 are freely received with a pair of apertures 118 and 120 formed in sidewall 18 in registration with grooves 38 and 50, respectively. The diameter of each groove 38 and 50 is such as to retain screws 116 which are threaded therein. Sidewall 20 is mounted to the opposite side of frame 16 in a manner similar to that described in connection with the mounting of sidewall 18. Although not shown, it is to be understood that, in the illustrated embodiment, the forward portion of fixed circuit board 110 rests on step 47 and the rearward portion of fixed circuit board 110 is received between pins 73, 75 and 71′, 69′. A connector 122 is inserted into aperture 114 and engages connector strip 112. A screw 123 is inserted into a through hole 125 formed in connector 122 and is threaded into hole 67. A screw 127 is inserted into a through hole 129 formed in connector 122 and is threaded into hole 63'. Cover 22 is removably inserted within guideway 54 forward of indicating devices 106, tabs 89 and 91 being slidably received within grooves 87 and 87', respectively. Filter 22 is a shield composed of a translucent plastic which is sufficiently flexible to be readily inserted and removed from guideway 54 by bending, but sufficiently rigid to be retained within guideway 54, access to the forward portion of component package 14 being obtained by pivoting filter 22 about tabs 89 and 91.

From the foregoing, it will be appreciated that when sidewalls 18, 20 are mounted to extrusion 16, there is provided a fitted panel meter casing for analog to digital converter 14. Accordingly, the invention provides a simple, inexpensive and universal panel meter casing which by separating a definite length of extrusion 16, is custom fitted for a variety of electronic component packages. For a fuller understanding of the various mounting configurations provided by cruciform opening 70 and mounting device 72, reference is made to FIGS. 4-9.

Figures 4, 5, 6, 7, 8, 9:
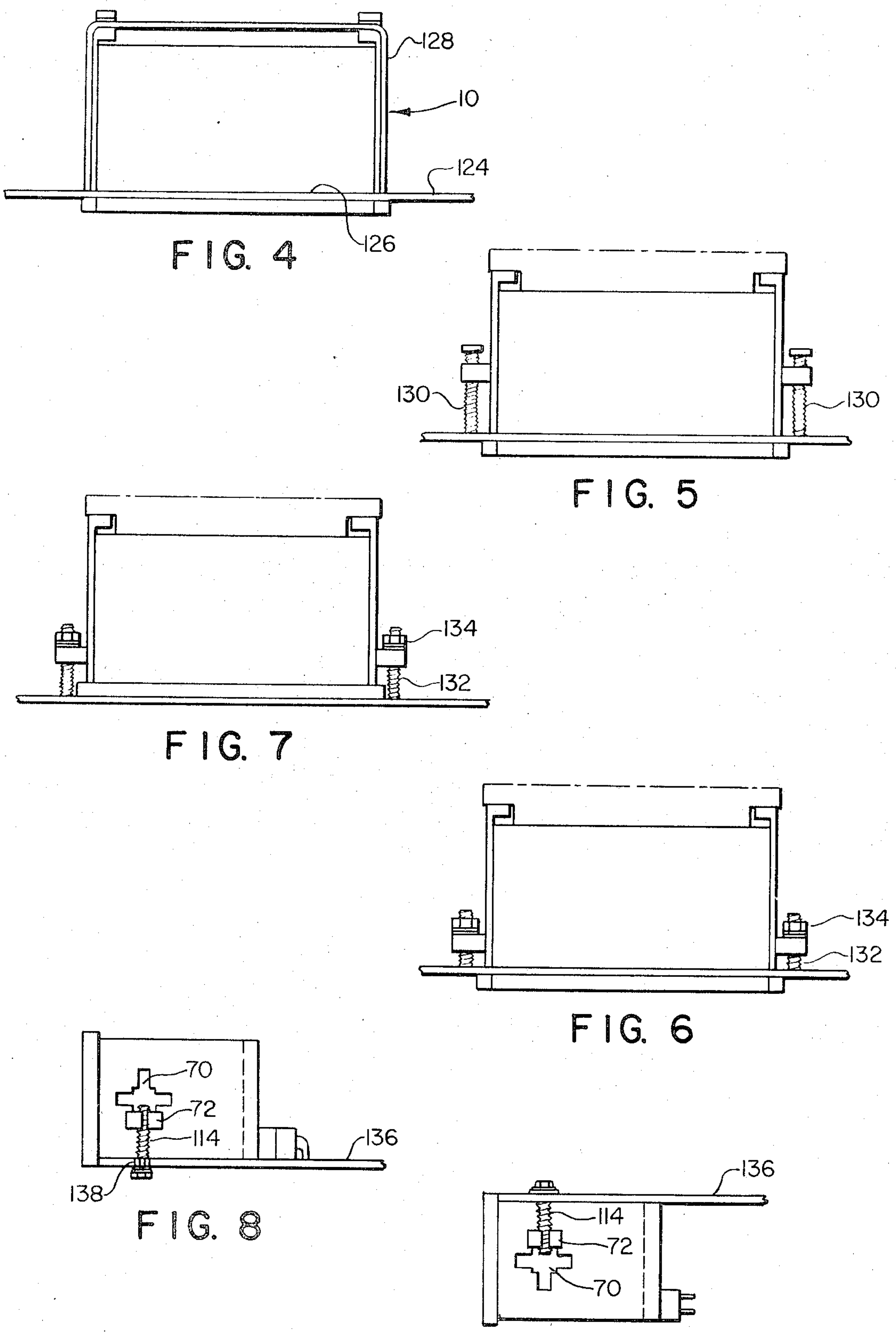
FIGS. 4–9 illustrate various mounting configurations of the panel meter of FIG. 1 provided by the present invention.

Referring now to FIGS. 4, 5, and 6, there are shown various front mounting configurations for securing panel meter 10 to a panel 124 which is formed with an aperture 126. The dimension of aperture 126 is such that the rearward faces of lips 32, 44 and flanges 62, 62' engage the front face of panel 124, the remaining portions of panel meter 10 being readily received through aperture 126. In FIG. 4, a U-shaped bracket 128 is affixed to flanges 64 and 64', by means of screws 125, 127 which are threaded respectively into holes 65, 65', in such a manner that panel meter 10 is secured to panel 124 by the vise-like action of bracket 128 and the rearward faces of flanges 62 and 62'. In FIG. 5, a fastening device 130, for example a self-tapping screw, is threaded into bore 82, mounting device 72 having been inserted in cruciform opening 70. It is to be understood that the diameter of bore 82 is such as to retain screw 130 which is threaded therein. As screw 130 is threaded into bore 82, the leading edge thereof engages the rearward face of panel 124. In consequence, panel meter 10 is secured to panel 124 by the vice-like action of screws 130 and the rearward faces of flanges 62 and 62'. In FIG. 6, panel 124 is provided with threaded studs 132 which are in registration with bores 82. Studs 116 are freely received within bores 82 and nuts 134 are threaded thereon in order to secure panel meter 10 to panel 124.

Rear or flush mounting of panel meter 10 to panel 124 having threaded studs 132 is shown in FIG. 7. In this case, panel meter 10 is mounted from the rear of panel 124. Panel meter 10 is secured to panel 124 in a manner similar to that described in connection with FIG. 6.

Mounting panel meter 10 to a base plate 136 for example, a printed circuit board, is shown in FIGS. 8 and 9. Unlike the mounting configurations described in connection with FIGS. 5, 6, and 7 wherein fastening device 72 is engaged in aperture 66, in circuit board mounting of panel meter 10, fastening device is engaged in aperture 68. It is to be understood that printed circuit board 136 is formed with through holes 138 which are in registration with bores 82 and are adapted to freely receive screws 130. In FIG. 8, mounting device 72 engages the lower portion of apertures 68. As screw 130 is threaded into bore 82, panel meter 10 is secured to printed circuit board 136. In FIG. 9, mounting device 72 engages the upper portion of aperture 68. As screw 130 is threaded into bore 82, panel meter 10 is secured to printed circuit board 136.

From the foregoing description, it will be readily appreciated that the combination of cruciform opening 70 and mounting device 72 is such as to provide front mounting, rear mounting and printed circuit board mounting of panel meter 10.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A casing for housing a component package comprising:

a. an extrusion formed with integral top, bottom and rear walls and open sides, said extrusion having a substantially U-shaped profile in cross section, said extrusion formed with an integral first rail at a forward margin of said top wall and an integral second rail at a forward margin of said bottom wall, said first and second rails extending in a plane in spaced parallel relationship with said rear wall, said first and second rails formed with opposed channels;

b. said extrusion adapted to receive said component package which is confined by said first and second rails and said rear wall;

c. a first sidewall mounted to said extrusion at one of said open sides;

d. a second sidewall mounted to said extrusion at the other of said sides;

e. said extrusion and said first and second sidewalls defining a casing open at a forward portion thereof, each of said first and second sidewalls formed with first and second intersecting slots, said first slot disposed in a substantially horizontal plane, said second slot disposed in a substantially vertical plane, said first and second slots having like, substantially rectangular, profiles and defining a cruciform opening, the intersection of adjacent sides of said first and second slots notched to form an enlarged entrance central of said cruciform opening; and f. a translucent shield seated in said channels formed in said first and second rails, said translucent shield operating to cover said open portion of said casing, said translucent shield composed of a material which is sufficiently rigid to be retained within said channels but sufficiently flexible to be removed readily.

2. A panel meter comprising:

a. a resilient extrusion formed with integral rear, top and bottom walls and open sides, said extrusion having a substantially U-shaped profile in cross section, said extrusion formed with an integral first rail at a forward end of said top wall and an integral second rail at a forward end of said bottom wall, said first and second rails in registration with another and extending along a plane in spaced parallel relationship to said rear wall, said first rail extending below said top wall, said second rail extending above said bottom wall, said first rail formed with a first channel at a forward face thereof and formed with a first stop at a rearward face thereof, said second rail formed with a second channel at a forward face thereof and formed with a second stop at a rearward face thereof, said first and second channels disposed opposite one another;

b. component means having a profile larger than the perpendicular distance between said first and second rails and smaller than the perpendicular distance between the interior faces of said top and bottom walls, said component means seated within a cavity defined by said first and second rails, said top and bottom walls and said rear wall, said component means retained within said cavity by said first and second stops;

c. a first sidewall mounted to said extrusion at an open side thereof;

d. a second sidewall mounted to said extrusion at an opposite open side thereof;

e. said extrusion and first and second sidewalls defining a casing opened at a forward end, each of said first and second sidewalls fromed with first and second intersecting slots, said first slot disposed in a substantially horizontal plane, said second slot disposed in a substantially vertical plane, said first and second slots having like, substantially rectangular, profiles and defining a cruciform opening, the intersection of adjacent sides of said first and second slots notched to form an enlarged entrance central of said cruciform opening; and f. a translucent shield seated within said first and second channel means, said shield operating as a cover for said open forward end of said casing.

3. A casing comprising:

a. an extrusion formed with integral top, bottom and rear walls and open sides, said extrusion having a substantially U-shaped profile in cross section, said top and bottom walls formed with integral rails at the forward margins thereof;

b. a first sidewall mounted to said extrusion at one open side thereof;

c. a second sidewall mounted to said extrusion at the other open side thereof;

d. said extrusion and said first and second sidewalls defining a casing having an opening at a forward portion, each of said first and second sidewalls formed with first and second intersecting slots, said first slot disposed in a substantially horizontal plane, said second slot disposed in a substantially vertical plane, said first and second slots having like, substantially rectangular, profiles and defining a cruciform opening, the intersection of adjacent sides of said first and second slots notched to form an enlarged entrance central of said cruciform opening.

4. The casing as claimed in claim 3 including mounting means having a head portion, a narrowed neck portion and a base portion, said base portion having a cross-sectional profile slightly smaller than said enlarged entrance and slightly larger than said first and second slots, said narrowed neck portion having a cross-sectional profile slightly smaller than said first and second slots, said body portion received in said enlarged entrance, said narrowed neck portion selectively received and retained in said first and second slots.

5. The casing as claimed in claim 4 wherein said head portion is formed with a reentrant opening.

6. The casing as claimed in claim 5 including mounting means having a head portion, a narrowed neck portion and a base portion, said base portion having a cross-sectional profile smaller than said enlarged entrance and larger than said first and second slots, said narrowed neck portion having a cross-sectional profile slightly smaller than said first and second slots, said body portion received in said enlarged entrance, said narrowed neck portion selectively received and retained in said first and second slots.

7. The casing as claimed in claim 3 wherein said extrusion is composed of a metal and each said sidewall is composed of a metal.

8. The casing as claimed in claim 3 wherein said extrusion is composed of a polymer.

* * * * *